Figure 1:
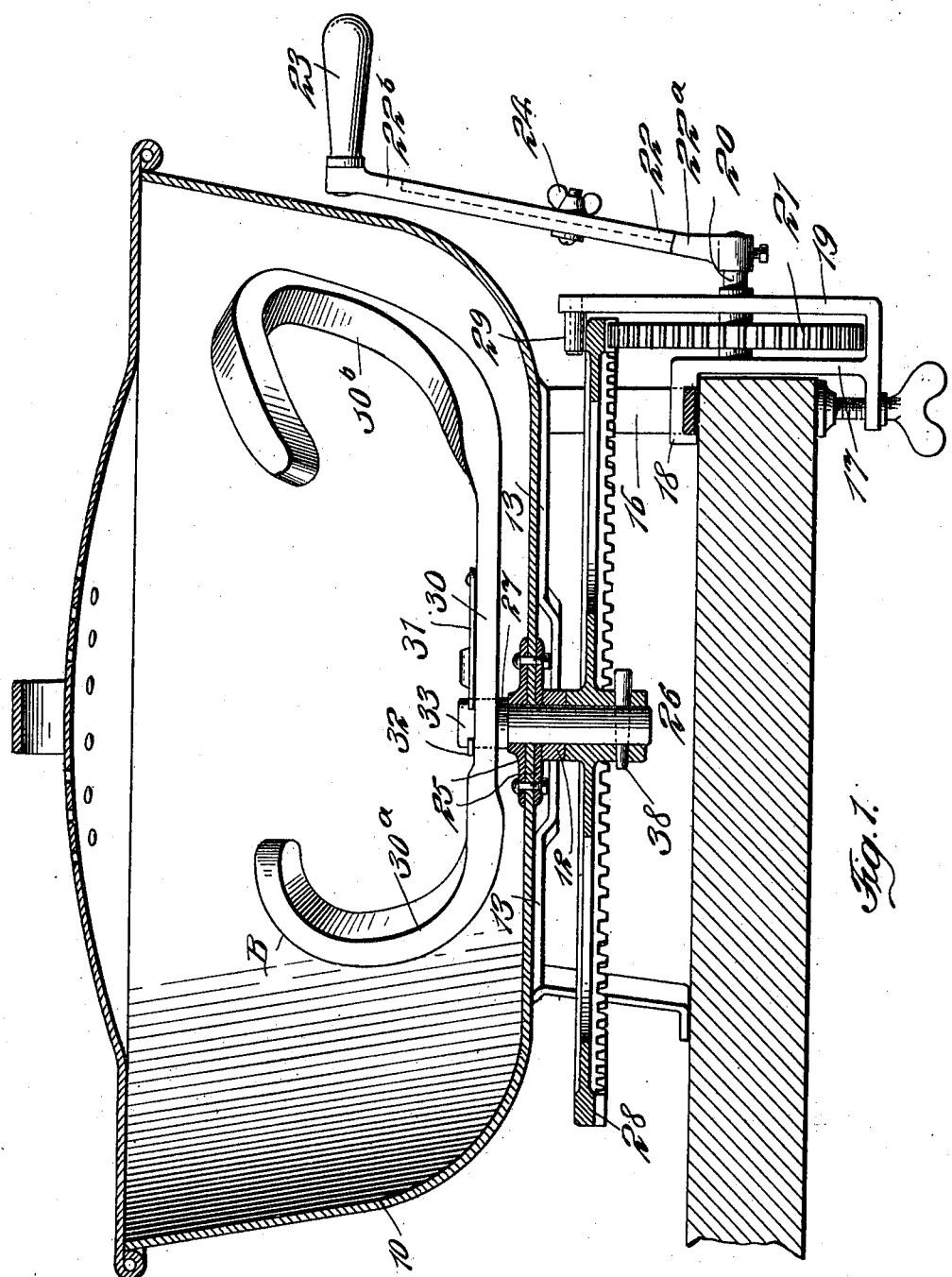

L. HAYNE & E. B. PIKE.
BREAD DOUGH MIXER.
APPLICATION FILED OCT. 29, 1909.

978,372.

Patented Dec. 13, 1910.

3 SHEETS—SHEET 3.

WITNESSES:

INVENTORS
Levi Hayne and
E. Bertram Pike
BY
ATTORNEY

UNITED STATES PATENT OFFICE.

LEVI HAYNE, OF SCHENECTADY, NEW YORK, AND EDWIN BERTRAM PIKE, OF PIKE, NEW HAMPSHIRE.

BREAD-DOUGH MIXER.

978,372.  Specification of Letters Patent.  Patented Dec. 13, 1910.

Application filed October 29, 1909. Serial No. 525,399.

*To all whom it may concern:*

Be it known that we, LEVI HAYNE and EDWIN BERTRAM PIKE, citizens of the United States, and residents of Schenectady, county of Schenectady, and State of New York, and of the town of Pike, county of Grafton, State of New Hampshire, respectively, have invented certain new and useful Improvements in Bread-Dough Mixers, of which the following is a full, clear, and exact description.

This invention relates more particularly to bread mixing machines for domestic use wherein a rotary stirrer or kneading device is mounted in a dough-containing pan, suitable means being provided for rotating the kneading device.

The primary object of the invention is to provide means for manipulating or kneading the dough from the under side or bottom instead of from the top as in the ordinary form of bread mixers. To accomplish this the stirring or kneading device is mounted on a shaft extending through the bottom of the dough pan, the operating mechanism being connected to the lower end of said shaft.

Another important object of the invention is to so construct the operating parts of the apparatus and the dough pan handle that they will be readily detachable, and be of such size and shape that they may be packed within the dough pan for convenience in shipping.

A further object of the invention is to provide means for detachably connecting the stirrer or kneading device to the stirrer shaft within the dough pan so that it may be readily disconnected and removed with the dough.

Another object of the invention is to provide a kneading device of peculiar construction and having one portion thereof adapted to gather the dough toward the center of the pan and another portion to distribute it or move it from the center of the pan toward the circumference thereof.

Another object of the invention is to provide an extensible operating handle whereby when the operation of kneading the dough is begun the handle may be shortened in order that the kneading device may be rapidly rotated without any considerable exertion on the part of the operator; and when the dough becomes stiff and partly kneaded the handle may be extended in order to increase the power applied to the stirrer shaft. Any suitable form of adjusting device may be employed which will permit of a rapid adjustment of the parts of the handle.

With these and other objects in view the invention will be hereinafter more particularly described with reference to the accompanying drawings which form a part of this specification and will then be pointed out in the claims at the end of this description.

Figure 2:
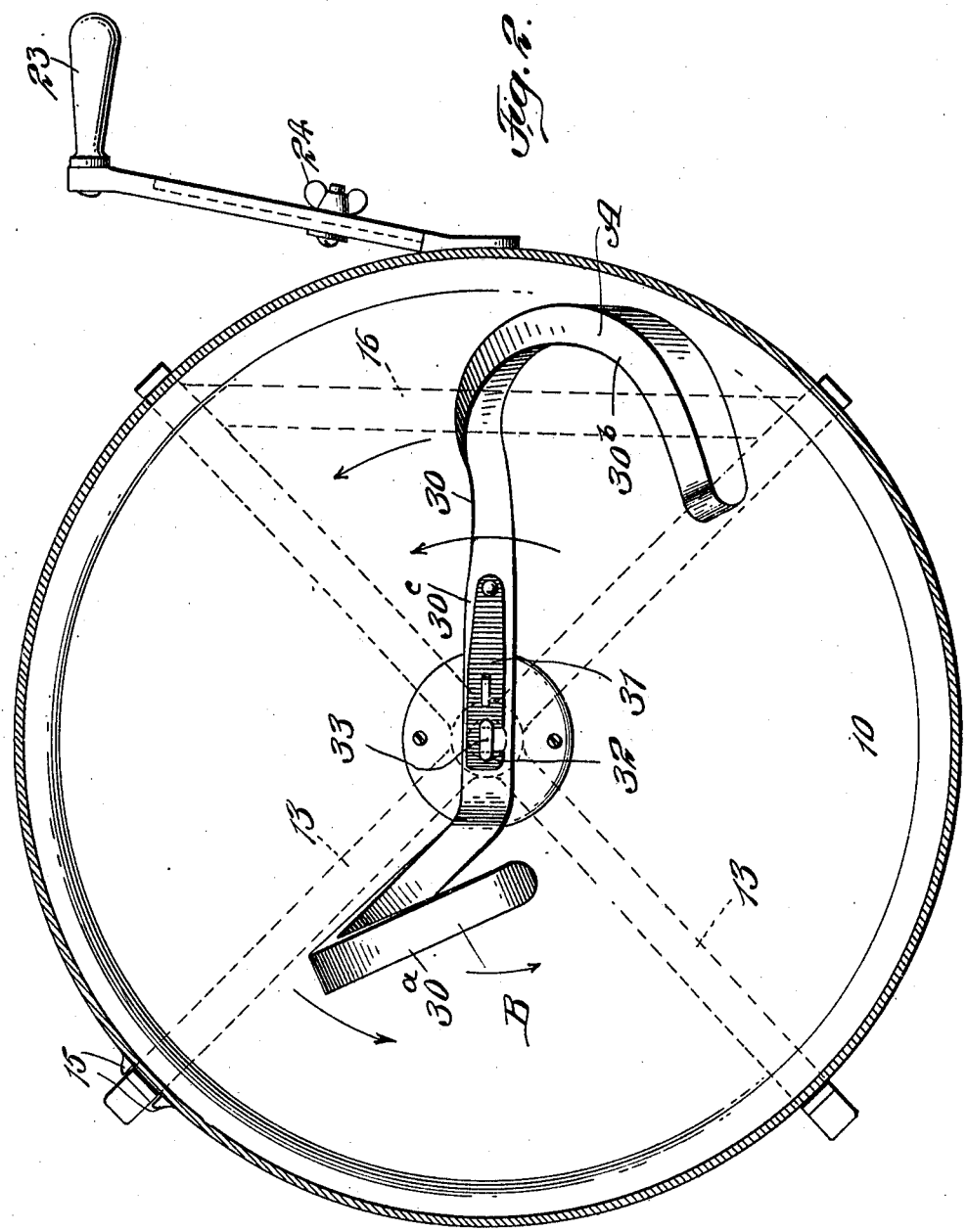
Figure 3:
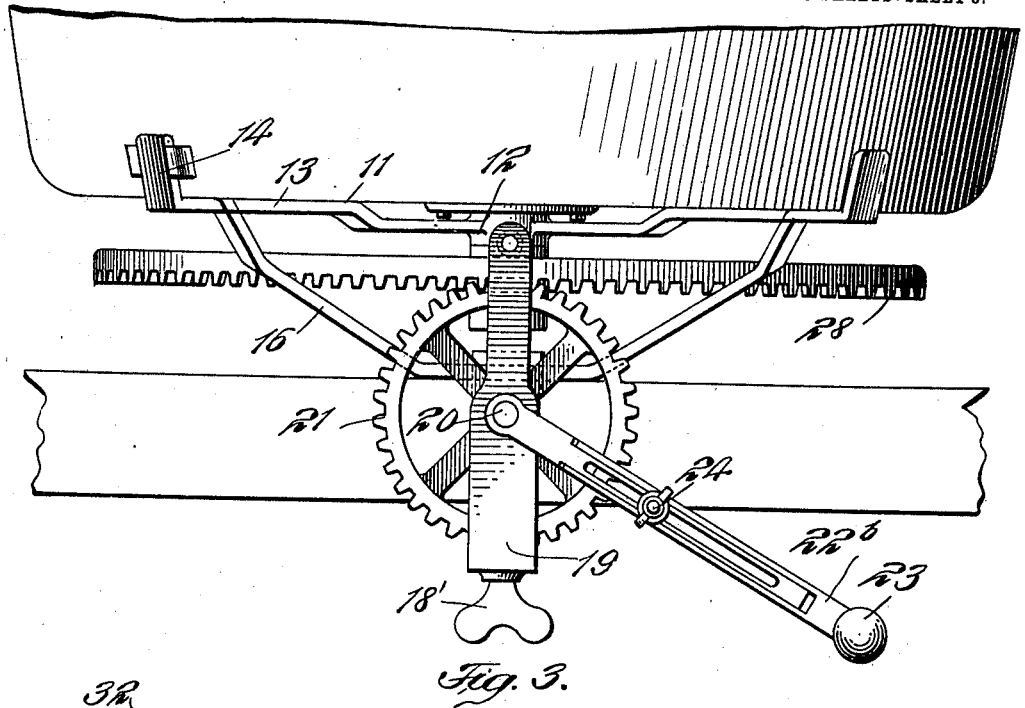
Figure 4:
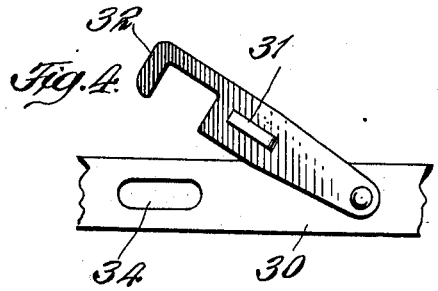
Figure 5:
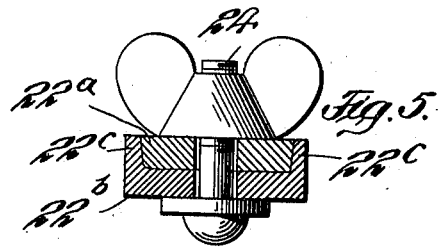
Figure 6:
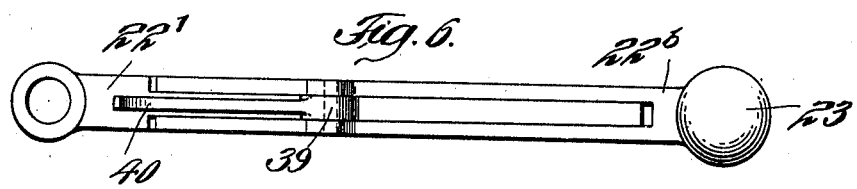
Figure 7:
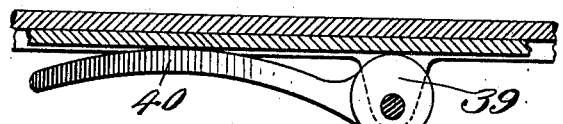

In the drawings: Figure 1 is a central vertical sectional view, the kneading device being shown in side elevation. Fig. 2 is a horizontal sectional view through the dough pan, showing the kneading device in plan view. Fig. 3 is a side elevation of the operating mechanism. Fig. 4 is a detail plan view of the central portion of the kneading device. Fig. 5 is a detail transverse sectional view of the extensible crank-arm. Fig. 6 is a detail elevation of a slightly different form of extensible crank-arm. Fig. 7 is a detail longitudinal sectional view of the device shown in Fig. 6.

The dough pan 10 is preferably circular in plan view and is mounted on a suitable supporting frame 11. This support is formed with a central hub 12 and arms 13 radiating therefrom, said arms being up-set slightly at a suitable distance from the web to form a substantial support for the dough pan, as shown clearly in Fig. 1. The ends of the radial arms extend upwardly, as shown at 14 in Fig. 3, to embrace the dough pan, and at any suitable point said pan is provided with lugs 15 between which is arranged one of the radial arms, or one of the up-turned ends of said arms, to prevent the rotation of the dough pan on its support. Two of the radial arms are connected together at their outer ends by a transverse bar 16 which at is middle is adapted to rest on the table on which the device is to be mounted. It will, therefore, be seen that the supporting frame has three points of bearing so that it may be firmly held to a table.

A holding clamp 17, having an upper recessed arm 18 to fit over the cross-bar 16, is provided, said clamp being fitted with a clamping screw 18' adapted to engage the under side of the table. This clamp is also formed with a vertical arm 19 in which is journaled the outer end of a short driving shaft 20 carrying a driving gear 21, said gear being arranged between the arm 19 and the main body of the clamp. On the outer end of the driving shaft 20 is removably mounted a crank arm 22, said arm being formed of two longitudinally extensible sections 22$^a$ and 22$^b$, a handle 23 being connected to the outer end of the section 22$^b$. The two sections of the handle are adjustably connected together by means of a clamping screw and thumb nut 24, said screw extending through registering slots in the two portions of the handle. The outer section of the handle 22$^b$ is formed with longitudinal parallel ribs 22$^c$ between which the inner section 22$^a$ of the handle fits. It will, therefore, be seen that the handle may be readily shortened or lengthened as desired. It is obvious that when the operation of kneading the dough is begun the kneading device will rotate quite freely and easily. At this point in the operation of the apparatus the handle may be conveniently shortened in order that the stirrer shaft may be rotated rapidly with as little exertion as may be necessary. When the kneading operation has proceeded the dough stiffens and then more power is required to rotate the stirring arm. At this point in the operation, the handle may be advantageously lengthened in order that the required power may be applied without too great an exertion on the part of the operator.

The dough pan 10 is provided at the center of its bottom with reinforcing bearing plates 25, one being secured to the outer surface of the bottom and the other being secured to the inner surface thereof. These bearing plates are centrally apertured for the passage of the stirrer shaft 26, said shaft being formed with the enlargement 27 at its upper end to form a shoulder adapted to bear on the top of the upper bearing ring. The stirrer shaft passes through hub 12 of the supporting frame and on the lower end of said shaft is mounted a crown gear wheel 28 having gear teeth on its under side, said wheel being arranged to mesh with the driving gear 21 of the driving shaft. In order to hold the two gears in mesh a small bearing roller 29 is journaled in the upper end of the arm 19 of the clamp frame. It will thus be seen that the crown wheel and the driving gear will be held in mesh during the operation of the apparatus.

On the upper end of the stirrer shaft within the dough pan, and close to the bearing plates is mounted a kneading device 30, said device being apertured for the passage of the stirrer shaft and carrying a pivoted latch bar 31 formed with a hook 32 at its free end adapted to engage under a head 33 formed on the upper end of the stirrer shaft and to thereby lock said device to the shaft. The upper end of the stirrer shaft is made rectangular and flat to permit it to pass through the elongated slot 34 in the kneading device, and said reduced upper end is undercut to form the head 33 and to receive the hook of the latch bar. By this means the kneading device will be held on the stirrer shaft and will rotate therewith.

The kneading device 30 is formed of a bar of suitable metal substantially rectangular in cross-section, and is bent to form the two kneading end portions 30$^a$ and 30$^b$ connected together by a substantially horizontal portion 30$^c$. It is arranged to rotate from right to left or anti-clockwise. The slot 34 by means of which the kneading device is connected to the stirrer shaft is formed through the horizontal portion of said device near the base or lower end of the kneading portion 30$^a$. The kneading portion 30$^a$ is considerably shorter than the portion 30$^b$, and is so arranged that during the rotation of the kneading device it forces the dough from the center of the pan toward the outer circumference thereof. The kneading device 30$^b$ extends near to the side wall of the dough pan and is so constructed that in operation it carries the dough toward the center of the pan. The kneading portion 30$^b$ forms what might be termed a gathering arm and curves upwardly from the end of the horizontal portion 30$^c$ and then rearwardly with respect to the direction of rotation of the kneading device, said portion being in the form of a semi-circular hook arranged in a plane inclined with respect to a vertical plane passing through the center of the stirrer shaft and through the horizontal portion of the kneading device. It will thus be seen that as the kneading device rotates the dough will to some extent follow the flat surface A of the kneading portion 30$^b$ and will be thereby directed toward the center of the pan. The kneading portion 30$^a$ is in the form of an upwardly curved, substantially semi-circular hook, the lower portion of said hook being arranged at a tangent to the stirrer shaft, and extending on the opposite side of the horizontal portion 30 from the kneading portion 30$^b$, the upper portion thereof curving forwardly with respect to the direction of rotation of the stirrer shaft and inwardly toward said shaft, and forming a distributing arm, as indicated in Fig. 2 of the drawing. It is obvious that the point of the hook will enter the dough ahead of the remaining portion of the kneading device and that said dough in following the flat surface B of said device will be forced toward the circumference of the pan. It will, of course, be understood that the kneading device may be bent or curved to any suitable form, it being desirable, however, that one of the kneading portions thereof shall be designed to take the dough from the outer portions of the pan and deliver it upward toward the center thereof; and that the other portion thereof shall be arranged to take the dough from the center of the pan and deliver it downwardly and toward the circumference thereof and in the path of the gathering arm or kneading portion 30$^b$.

We have found in operation a kneading device constructed as shown in the drawings will gradually work the dough into cone shape, and that when the cone has reached a certain height, depending upon the stiffness of the dough and the quantity in the pan, it will topple over usually near the outer side of the kneading portion 30$^a$. It will thus be seen that the dough materials will be thoroughly mixed and kneaded and that the kneading action is at the bottom of the dough. It is also important to note that the gathering arm gradually raises the dough into cone-shape and that this action is repeated over and over again during the kneading operation, thereby making a lighter dough by combining with it more oxygen than it is possible to do with the ordinary and usual methods of kneading dough, thereby producing a dough which will rise quickly and make a lighter bread. The crown wheel is preferably secured to the lower end of the stirrer shaft by means which will permit it to be readily disconnected from said shaft. In the drawing we have shown a tapered pin 38, but it will be understood that any suitable detachable fastening means may be employed.

From the foregoing it will be readily seen that all of the parts of this device are so connected that the device may be readily dismantled, for instance by removing the pin 38 the stirrer shaft may be removed and the crown wheel disengaged; by releasing the latch hook 31 the kneading device may be disconnected from the stirrer shaft; the holding clamp may be disconnected from the table and from the supporting frame by loosening the clamping screw, and the operating crank disconnected from the driving shaft by loosening the nut screw holding it thereto. When these parts are disconnected they are all of such size and shape that they may be readily placed within the dough pan for convenience in shipping.

In Figs. 6 and 7 is shown a slightly different form of means for varying the length of the crank arm. As shown in these figures the inner section 22' of the crank arm slides in a groove in the section 22$^b$, a clamping eccentric 39 is pivoted in lugs formed on the section 22$^b$ and is provided with an operating handle 40. The eccentric is so mounted as to form a clamp to hold the two portions of the crank arm in their adjusted positions, as shown clearly in Fig. 7.

From the foregoing it is apparent that we provide a new article of manufacture and of commerce, which is simple in construction and, therefore, may be cheaply manufactured; which may be readily assembled and set up for use. It is also manifest that when dismantled the parts may be packed within the dough pan and that the said pan will make a convenient package for shipping.

Having thus described our invention we claim as new and desire to secure by Letters Patent:

1. A dough mixer comprising a dough pan, a kneading device therein comprising a bar having one of its ends curved upwardly rearwardly with respect to the direction of rotation of the kneading device and then inwardly to form a gathering arm adapted to move the dough inwardly and upwardly, the other end of said bar being curved upwardly and forwardly with respect to the direction of rotation of the kneading device to form a distributing arm adapted to move the dough outwardly and downwardly, this latter arm being shorter than the gathering arm and arranged to move the dough into the path of the gathering arm, and means for rotating the kneading device.

2. A dough mixer comprising a pan, a pan support formed with radial arms adapted to embrace the pan and with supporting legs, one of said legs connecting together two of the radial pan-holding arms, a clamp adapted to engage said leg to hold the pan supporting frame, a driving gear carried by said clamp, a stirrer shaft extending through the bottom of the dough pan and through the pan support, a crown gear on the lower end of said stirrer shaft and arranged to mesh with the driving gear, means for holding said two gears in mesh, an operating crank connected to the driving shaft, and a kneading device connected to the stirrer shaft within the dough pan.

3. A dough mixer comprising a dough pan, a kneading device therein formed of a bar having a substantially horizontal portion and two end kneading portions, one of its ends being curved upwardly and rearwardly with respect to the direction of rotation of the kneading device, and then inwardly to form a gathering arm to move the dough inwardly and also upwardly, the other end of said bar being curved upwardly and forwardly with respect to the direction of rotation of the kneading device, its extreme end being also turned inwardly, to form a distributing arm adapted to move the dough outwardly and downwardly, means for rotating said arm, said means being connected thereto at the horizontal portion of said arm, the distributing arm being shorter than the gathering arm, and serving to move the dough into the path of the gathering arm.

4. A dough mixer comprising a dough pan, a kneading device therein formed of a bar having a substantially horizontal portion and two end kneading portions, one of its ends being curved upwardly and rearwardly with respect to the direction of rotation of the kneading device, and then inwardly to form a gathering arm to move the dough inwardly and also upwardly, the other end of said bar being curved upwardly and forwardly with respect to the direction of rotation of the kneading device, its extreme end being also turned inwardly to form a distributing arm adapted to move outwardly and downwardly, means for rotating said arm, said means being connected thereto at the horizontal portion of said arm, the distributing arm being shorter than the gathering arm, and serving to move the dough into the path of the gathering arm, and a latch device for detachably connecting the kneading device to the driving means.

5. A dough mixer comprising a pan, a stirrer shaft extending through the bottom of said pan, a kneading device secured to said shaft within the pan comprising a bar having one of its ends curved upwardly rearwardly with respect to the direction of rotation of the kneading device and then inwardly to form a gathering arm adapted to move the dough inwardly and upwardly, the other end of said bar being curved upwardly and forwardly with respect to the direction of rotation of the kneading device to form a distributing arm adapted to move the dough outwardly and downwardly, a support for said pan and on which said pan rests, the lower end of the stirrer shaft extending through said support, a gear mounted on the lower end of said shaft below the support, a clamp adapted to engage the pan support, a driving gear carried by said clamp and meshing with the gear on the stirrer shaft, and a crank connected to the shaft of said driving gear.

6. A dough mixer comprising a pan, a stirrer shaft extending through the bottom of said pan, a kneading device secured to said shaft within the pan comprising a bar having one of its ends curved upwardly rearwardly with respect to the direction of rotation of the kneading device and then inwardly to form a gathering arm adapted to move the dough inwardly and upwardly, the other end of said bar being curved upwardly and forwardly with respect to the direction of rotation of the kneading device to form a distributing arm adapted to move the dough outwardly and downwardly, a support for said pan, and on which said pan rests, the lower end of the stirrer shaft extending through said support, a gear mounted on the lower end of said shaft below the support, a clamp adapted to engage the pan support, a driving gear carried by said clamp and meshing with the gear on the stirrer shaft a crank connected to the shaft of said driving gear, and a latch device carried by the kneading device and adapted to detachably connect it to the upper end of the stirrer shaft within the pan.

7. A dough mixer comprising a dough pan, a kneading device therein formed with a lower substantially horizontal portion and two upwardly extending and inwardly curved end portions, one of said portions being longer than the other, a stirrer shaft extending through the bottom of said pan and connected to the substantially horizontal portion of the kneading device, a support for said pan, and on which said pan rests, the lower end of the stirrer shaft extending through said support, a gear mounted on the lower end of said shaft below the support, a clamp adapted to engage the pan support, a driving gear carried by said clamp and meshing with the gear on the stirrer shaft, and a crank connected to the shaft of said driving gear.

In testimony whereof I hereunto affix my signature in the presence of two witnesses this 22nd day of October, 1909.

LEVI HAYNE.

Witnesses:
J. HAROLD MERRY,
CHARLES N. WORT.

In testimony whereof I hereunto affix my signature in the presence of two witnesses this 25th day of October, 1909.

EDWIN BERTRAM PIKE.

Witnesses:
EMILE BLANK,
WM. S. UDALL.